United States Patent
Chen et al.

(10) Patent No.: US 9,401,008 B2
(45) Date of Patent: Jul. 26, 2016

(54) METHOD FOR IDENTIFYING AND EXTRACTING A LINEAR OBJECT FROM AN IMAGE

(71) Applicant: UNIVERSITY OF ELECTRONIC SCIENCE AND TECHNOLOGY OF CHINA, Chengdu, Sichuan (CN)

(72) Inventors: Yunping Chen, Sichuan (CN); Ling Tong, Sichuan (CN); Yan Chen, Sichuan (CN); Bo Gao, Sichuan (CN); Yu Tian, Sichuan (CN); Yuxia Li, Sichuan (CN); Weihong Han, Sichuan (CN); Yang Li, Sichuan (CN)

(73) Assignee: UNIVERSITY OF ELECTRONIC SCIENCE AND TECHNOLOGY CHINA, Chengdu, Sichuan (CN)

( * ) Notice: Subject to any disclaimer, the term of this patent is extended or adjusted under 35 U.S.C. 154(b) by 44 days.

(21) Appl. No.: 14/598,512

(22) Filed: Jan. 16, 2015

(65) Prior Publication Data
US 2015/0206025 A1 Jul. 23, 2015

(30) Foreign Application Priority Data
Jan. 17, 2014 (CN) .......................... 2014 1 0021143

(51) Int. Cl.
*G06K 9/46* (2006.01)
*G06T 5/00* (2006.01)
*G06T 7/00* (2006.01)

(52) U.S. Cl.
CPC .............. *G06T 5/00* (2013.01); *G06K 9/4647* (2013.01); *G06T 7/0042* (2013.01); *G06T 7/0085* (2013.01); *G06T 2207/20192* (2013.01)

(58) Field of Classification Search
None
See application file for complete search history.

(56) References Cited

U.S. PATENT DOCUMENTS

2002/0028019 A1* 3/2002 Hemiari ............... G06K 9/4604
382/190
2005/0031191 A1* 2/2005 Venkatachalam .... G06K 9/4633
382/152

(Continued)

OTHER PUBLICATIONS

Zhu et al, "A Double-Side Filter Based Power Line Recognition Method for UAV Vision System", 2013, Proceeding of the IEEE International Conference on Robotics and Biomimetics (ROBIO), pp. 2655-2660.*

(Continued)

*Primary Examiner* — David F Dunphy
(74) *Attorney, Agent, or Firm* — Benjamin C. Armitage; Billion & Armitage (57) ABSTRACT

A method for identifying and extracting a linear object from an image is disclosed. The method comprises: acquiring an original image to be processed, wherein the original image is taken by a camera, received through network transmission or copied from a compact disc or a removable disk; preprocessing the original image to obtain an enhanced image; extracting an edge information image from the enhanced image; then extracting linear features by performing, on the edge information image, a linear feature extracting transform improved with a cluster operator; finally; identifying and extracting the linear object by distinguishing the linear object from other linear features by considering characteristics of the linear object to be identified and extracted. According to the invention, a linear feature extracting transform improved with a cluster operator is constructed from a distribution of edge pixels in the edge information image along a 2-dimensional direction, which makes it possible to extract, rapidly and accurately, weak linear objects such as power lines from images having complicated background and sub-pixels.

7 Claims, 5 Drawing Sheets

(56) References Cited

U.S. PATENT DOCUMENTS

| | | | |
|---|---|---|---|
| 2013/0163843 A1* | 6/2013 | Park | G06T 7/0012 382/132 |
| 2013/0226667 A1* | 8/2013 | Terrazas | G06Q 30/0205 705/7.34 |
| 2015/0185017 A1* | 7/2015 | Kreider | G06K 9/00664 382/165 |

OTHER PUBLICATIONS

Yan et al, "Automatic Extraction of Power Lines From Aerial Images," 2007, IEEE Geoscience and Remote Sensing Letters, vol. 4, No. 3, pp. 387-391.*

* cited by examiner

METHOD FOR IDENTIFYING AND EXTRACTING A LINEAR OBJECT FROM AN IMAGE

CROSS REFERENCE TO RELATED APPLICATION

This application claims benefit of Application No. 201410021143.0, filed on 17 Jan. 2014 in China and which application is incorporated herein by reference. A claim of priority is made.

TECHNICAL FIELD

The present invention relates to the field of image processing, more particularly, to a method for identifying and extracting a linear object from an image.

BACKGROUND

Ultrahigh voltage transmission lines play a key role in power transmission across the country, and inspection/management of transmission lines is a critical task in effectively ensuring the safety of power transmission and distribution lines as well as the related equipment. Currently, inspection of power lines in many countries including China still relies on manual record, which has the disadvantages of being costly and risky with possible inspection missing. Over the past two decades, aerial inspection was used for inspection of Ultrahigh voltage transmission lines, which significantly improved the efficiency and precision of detection. However, such a method is restricted by flight safety, airline control, weather conditions and refueling requirements. To ensure flight safety, it requires not only many security measures but also extensive training of pilots on operation and inspection skills. As a result, helicopter inspection met difficulty in gaining popularity. Recently, unmanned aerial vehicle (UAV) was also used to inspect power lines. However, the safety issues and short of endurance hamper its further application.

Rapid development of space technology helped to improve the ability to obtain spatial surface information. Many commercial satellites had achieved spatial resolutions in the range of sub-meter and the revisit cycle had also shortened to one day. Currently, the most commonly used commercial satellites with high resolution include QuickBird, GeoEye-1 and Worldview, and the highest achievable resolution is 0.41 meter. It is expected that higher resolution will be available in the future, which makes it possible to inspect power lines by using the satellite sensing technologies.

Except for research on identifying and extracting power lines from images taken aerially and LiDAR data, currently there is hardly any other research on power line identification and extraction by using satellite remote sensing images across the world, which is due to the characteristics of having sub-pixels, weak objects and complicated background of satellite remote sensing images. However, high resolution satellite remote sensing images have irreplaceable advantages in terms of cycle, cost and efficiency of acquisition. Therefore, an urgent problem to be solved is to identify and extract a weak linear object such as a power line from images having sub-pixels, weak objects and complicated background, such as satellite images.

SUMMARY

An objective of the present invention is to overcome the disadvantages of the conventional art and to propose a method for identifying and extracting a linear object from an image, such that identification and extraction of linear objects from images having sub-pixels, weak objects and complicated background are feasible.

The objective of the present invention is achieved by the method for identifying and extracting a linear object from an image. According to the method, the original image to be processed is taken by a camera, received through network transmission, or copied from a compact disc or a removable disk. Then the image is preprocessed to obtain the enhanced image, from which the edge information image is extracted. After that the linear features of the edge information image are extracted by performing a linear feature extracting transform improved with a cluster operator. Finally, the linear object is identified and extracted by distinguishing the linear object from other linear features by considering characteristics of the linear object to be identified and extracted. In the invention, the linear feature extracting transform improved with a cluster operator is constructed from a distribution of edge pixels in the edge information image along a 2-dimensional direction, which makes it possible to extract, rapidly and accurately, weak linear objects such as power lines from images having complicated background and sub-pixels.

DETAILED DESCRIPTION

In the following, specific embodiments of the present invention will be described in detail with reference to the accompanying drawings such that those skilled in the art can better understand the invention. Well-known functions and designs are not described in detail to avoid obscuring the present invention.

Figure 1:
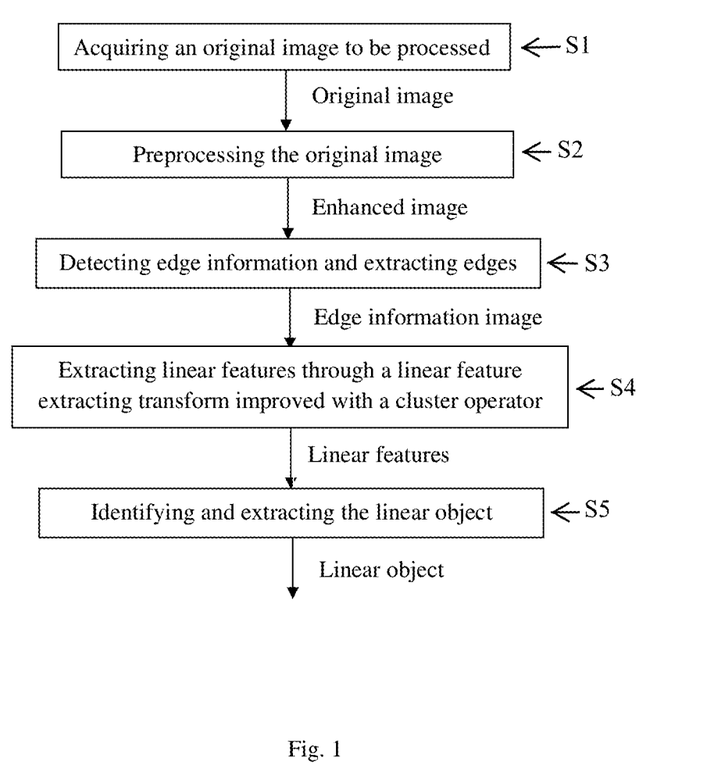
FIG. 1 illustrates a flow chart of a method for identifying and extracting a linear object from an image according to an embodiment of the present invention.

FIG. 1 illustrates a flow chart of a method for identifying and extracting a linear object from an image according to an embodiment of the present invention.

In the embodiment as illustrated in FIG. 1, the method for identifying and extracting a linear object from an image comprises the steps of:

S1. Acquiring an Original Image to be Processed,

As an example, the original image to be processed may be taken by a camera. Alternatively, an image obtained by other devices may be received through network transmission as the original image to be processed. In another embodiment, the original image to be processed is copied from a compact disc or a removable disk. In the embodiment, the original image is a high resolution remote sensing image taken by a camera mounted on a remote sensing satellite.

S2. Preprocessing the Original Image,

The acquired original image is preprocessed to obtain an enhanced image. In the embodiment, Curvelet transform and inverse Curvelet transform are performed on the high resolution remote sensing image to improve smoothness, reduce noises and improve contrast of the high resolution remote sensing image, such that linear edge features of the high resolution remote sensing image are highlighted and an enhanced image is obtained.

S3. Extracting Edges,

Edge information of the enhanced image is detected to extract an edge information image from the enhanced image. In an embodiment, the edge information of the enhanced image is detected by using an optimal edge detection operator (i.e. Canny operator (edge detector)), such that the edge information of the enhanced image is extracted.

S4. Extracting Linear Features

Linear features of the edge information image are extracted by performing, on the edge information image, a linear feature extracting transform that utilizes a cluster operator. In one embodiment, the linear feature extracting transform introduces a cluster operator into a Radon transform, to provide a Cluster Radon Transform (CRT). Linear feature detection is performed by way of CRT on the edge information image obtained from Canny operator to extract the linear features including the linear object. In the embodiment, the linear object to be identified and extracted is power lines.

S5. Identifying and Extracting the Linear Object

The linear object is identified and extracted by distinguishing the linear object from other linear features by considering characteristics of the linear object to be identified and extracted.

In an embodiment of the present invention, power lines are distinguished from the other linear features by considering one or more characteristics of the power lines such as—their relatively simple structure, small width pixel, being parallel to each other and having similar background on both sides of the power lines in the remote sensing image. In this way, the power lines may be identified and extracted from the image.

Figure 2:
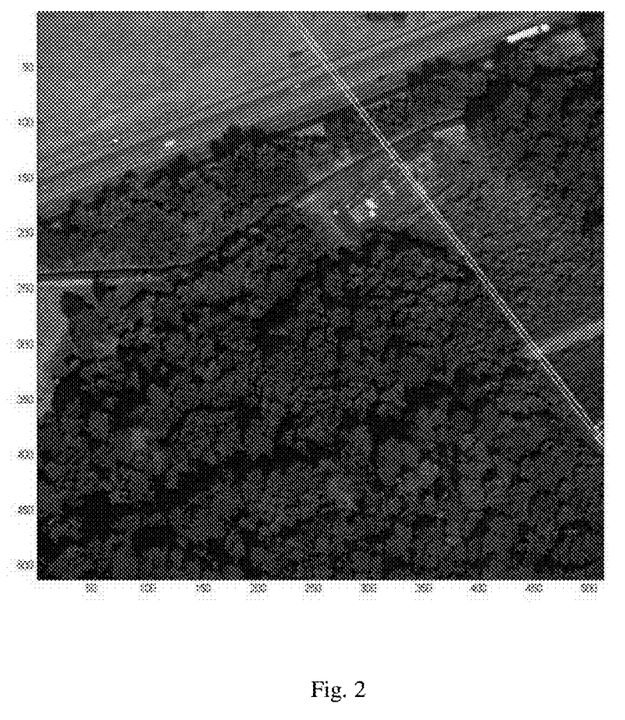
FIG. 2 is an original image to be processed.

FIG. 2 is an original image to be processed, which is a GeoEye-1 remote sensing image with a size of 512*512. It is seen from FIG. 2 that a power line spans from north to south-east across the remote sensing image with a very complicated background, including barren lands, roads, a power transformer substation and a large forest in the south. Meanwhile, there are a lot of noises in the image, which makes it even harder to identify and extract the power lines. That is the technical problem to be solved by the invention, i.e., to automatically identify and extract the power lines by suppressing the random noises after edge extraction of the high resolution remote sensing image and the system noise generated by non-object straight lines.

The embodiment will be described thereafter in detail with reference to FIGS. 2 to 8.

1. The acquired image to be processed, i.e., the high resolution remote sensing image of the embodiment, is preprocessed, in which Curvelet transform and inverse Curvelet transform are performed on the high resolution remote sensing image to improve smoothness thereof, which will help to reduce noises and improve contrast of the high resolution remote sensing image, such that linear edge features of the high resolution remote sensing image are highlighted and an enhanced image is obtained. By this means it gets ready for the edge detection that follows.

2. Edge information of the enhanced image is detected, by using an optimal edge detection operator, which is Canny operator in the embodiment, to extract edge information from the enhanced image, thereby forming an edge information image. A detailed method is as follows:

i) The gradient amplitude and direction of the image is calculated by using first-order partial derivative finite difference;

ii) Non-maximal suppression is performed on the gradient amplitude;

iii) Edges are detected and connected by using the double thresholds, i.e., the high threshold value and the low threshold value, to obtain the edge information image.

Figure 3:
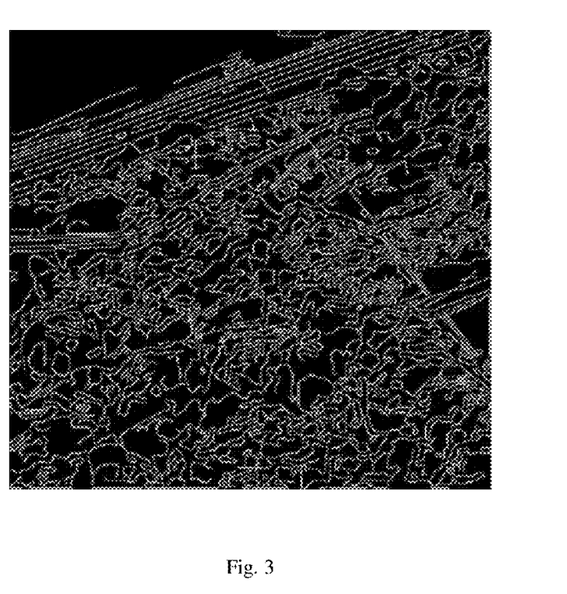
FIG. 3 is an edge information image obtained after extracting edge information from an enhanced image by using Canny operator.

FIG. 3 is the edge information image obtained after extracting edge information from the enhanced image by using the Canny operator.

3. The Cluster Radon Transform (CRT), utilizing the introduced cluster operator, is used to detect linear features of the edge information image to extract the linear feature including the power lines.

A conventional Radon Transform may be defined in a space of any dimensions and in many forms. An exemplary 2-dimensional definition is as follows:

$$R(\rho,\theta)=\int_D f(x,y)\delta(x\cos\theta y\sin\theta-\rho)dxdy$$

wherein D is the entire edge information image plane, f(x,y) is a binary value of a pixel with coordinates (x,y) on the edge information image, δ is a Dirac Delta function, ρ is a distance between a straight line and the origin of the edge information image plane (i.e., the (x,y) plane), θ is an angle between the normal from the origin to the straight line and the x-axis.

For the Radon space (ρ,θ), the following equation may be used to reconstruct the straight line in the original image space:

$$y=(\rho/\sin\theta)-x\cot\theta$$

Figure 4:
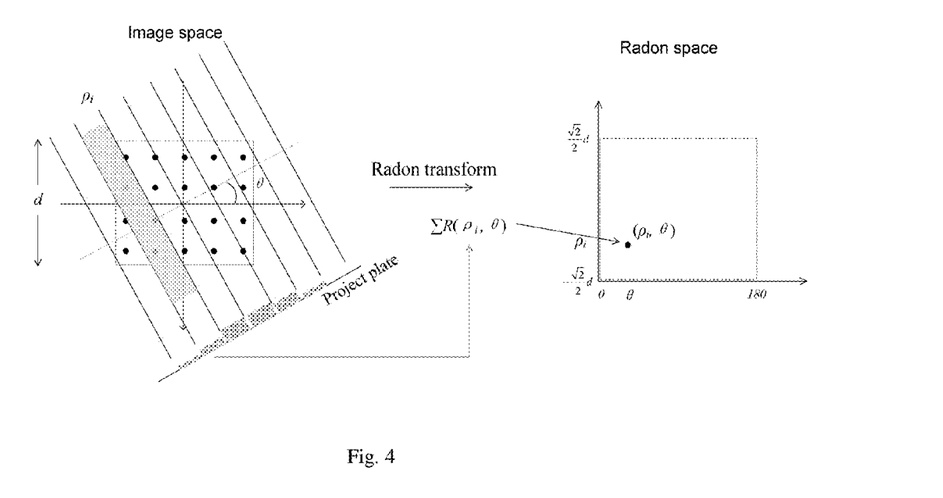
FIG. 4 schematically illustrates the geometrical principle of Radon Transform.

After the Radon transform, peaks with maximum or minimum values of R(ρ,θ) in the plane (ρ,θ) correspond to longer or short line segments in the plane (x,y). It is seen that Radon transform converts the line detection in the plane (x,y) to extremal point search in the plane (ρ,θ). FIG. 4 illustrates the geometrical principle of Radon Transform.

Figure 5:
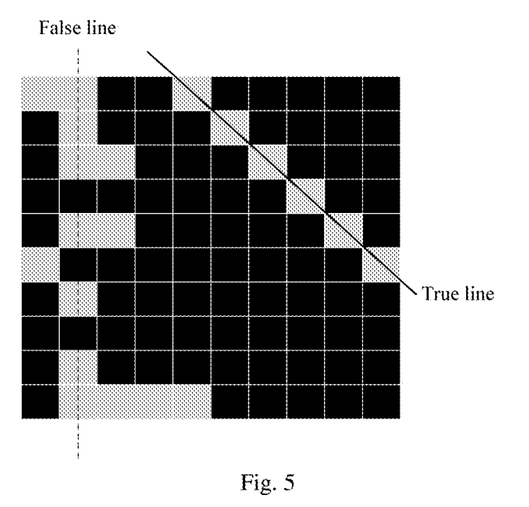
FIG. 5 schematically illustrates a false alarm generated by conventional Radom Transform.

However, system noises caused by non-linear features may cause the conventional Radon transform to misjudge when detecting linear features. As illustrated in FIG. 5, there is a straight line in the upper right part of the image, and there is a false line caused by the system noises on the left side of the image. As the false line takes up 7 pixels on its direction (along the vertical direction), and the real straight line takes up only 6 pixels (approximately along its direction with an angle of 135 degrees), the Radon transform will extract the false line instead of the real straight line first. Such false alarms are quite common in detecting and extracting weak linear objects such as power lines (see FIGS. 2 and 3), as the power lines are in themselves week linear objects and the background noises are strong. To solve the above problem, the invention improves the conventional Radon Transform by introducing a cluster operator $I_{\phi,r}$. The cluster operator $I_{\phi,r}$ is a function proportional to a cluster distribution density, and the cluster distribution density represents a distribution of edge pixels along a 2-dimensional direction in the edge information image.

In the embodiment, the cluster operator $I_{\phi,r}$ is defined as the following equation:

$$I_{\varphi,r} = g(\varphi, r) = \frac{\sum f_\varphi(x_i, y_j)}{r} \left(\varphi = \frac{\pi}{2} + \theta\right).$$

wherein g(i) is a function for computing the pixel cluster influence factor, that is, a function proportional to the cluster distribution density, r is a range for computing the cluster operator, φ is a direction for computing the cluster operator and has a following relationship with θ in the Radon transform:

$$\varphi = \frac{\pi}{2} + \theta;$$

$f_\varphi(x_i, y_j)$ is a value of a pixel (x,y) in the range of r and along the direction of φ, $\Sigma f_\varphi(x_i, y_j)$ is a sum of values of all of the pixels (x,y) within the range of r along the direction of φ, and r is the range for computing the cluster operator. Within a certain range, the larger r is, the better the real cluster situation is reflected, though the longer the computation time is increased. In one embodiment, It is verified by experiment, that a cluster range r of 5 to 10 may reflects the cluster situation while effectively control minimizing the computation time.

It is seen form the above equation that the more pixel clusters there is in the direction φ and the range r, the larger the value of $I_{\varphi,r}$ is, which can effectively suppress the influence of the discrete points.

Computation is performed on the example of FIG. 5 by setting the cluster range r as 5. In this case, along the vertical direction, the cluster operator of pixel (1, 2) is $I_{\pi/2,5}=4/5=0.8$ that of pixel (2, 2) is $I_{\pi/2,5}=3/5=0.6$ and so on. It follows that the value of the false line in the Radon space is 0.8×1+0.6×1+ 0.6×1+0+0.6×1+0+0.75×1+0+1+1=5.35, instead of 7 as calculated by the conventional Radon algorithm. Similarly, it can be easily found that the value of the real straight line is 6, which is larger than that of the false line. As a result, the real straight line can be successfully extracted. It can be easily seen that the method is very sensitive to noises and exhibits a strong anti-noise capability, which is especially suitable for extracting weak linear objects from a complicated background.

The following equation is obtained by introducing the above cluster operator $I_{\varphi,r}$ into the conventional Radon transform:

$$R(\rho,\phi) = \int_D I_{\phi,r} f(x,y) \delta(x\cos\theta + y\sin\theta - \rho) dx dy$$

Figure 6:
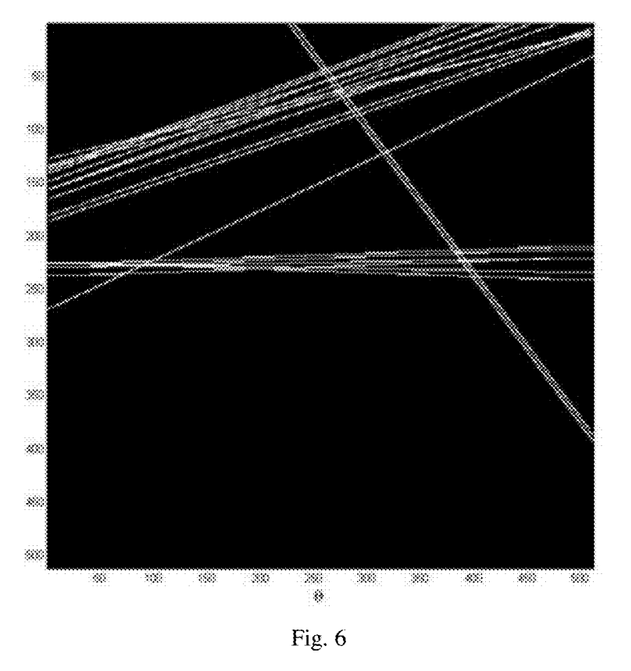
FIG. 6 is a diagram illustrating linear features extracted from the edge information image by linear feature detection via CRT transform.

The linear features of the edge information image are detected by using the improved CRT transform, which can effectively extract the linear features as illustrated in FIG. 6.

Figure 7:
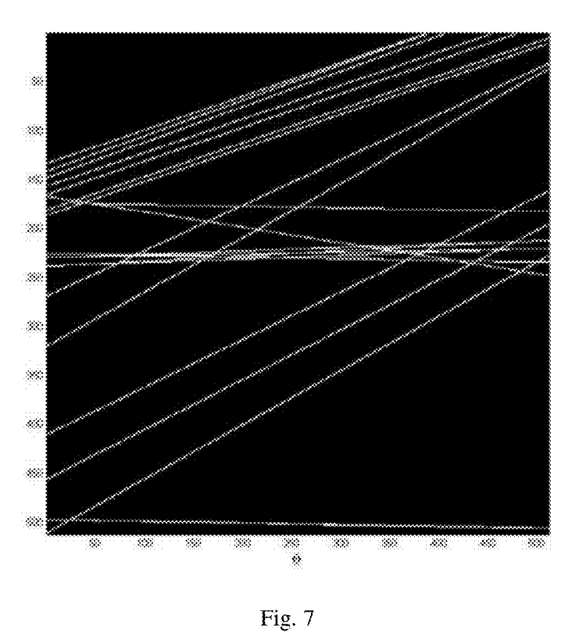
FIG. 7 is a diagram illustrating linear features extracted from the edge information image by linear feature detection via conventional Radon Transform.

FIG. 7 illustrates the result of linear object extraction by the conventional Radon Transform. It is seen that the power lines are not extracted; instead, many false straight lines caused by forest shadow are extracted.

4) In the embodiment, after the line features are effectively extracted by the improved cluster Radon transform, the power lines are further extracted from other linear features by considering the characteristics of the power lines in the high resolution remote sensing image. The power lines mainly have the following characteristics in the high resolution remote sensing image:

i) Having a simple topological structure, being generally straight and long, and running through the whole high-resolution remote sensing image;

ii) Having a width of approximately 1-2 pixels;

iii) Being parallel to each other;

iv) Having complicated background including natural features like forests, rivers, and man-made features like roads and buildings.

In addition to the above four features, in order to extract the power lines from other linear features in the embodiment, a fifth characteristic is considered:

v) Having similar backgrounds on both sides, which is different from other linear features such as road boundary.

Figure 8:
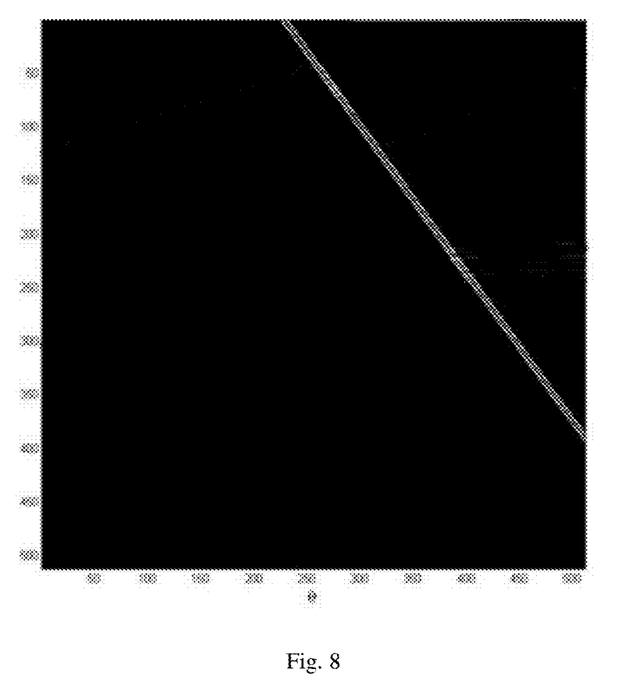
FIG. 8 is an image of the extracted linear object, that is, power lines.

The above characteristics are used to distinguish the linear object, i.e. the power lines, from the other linear features, thereby identifying and extracting the power lines as illustrated in FIG. 8.

In the embodiment, the extracted linear objects are power lines, though other linear objects may be extracted from the images according to characteristics thereof.

The above is only the preferred embodiment of the invention and is not intended to limit the invention. For a person skilled in the art, the invention may have a variety of changes and modifications. Any change, equivalent replacement, improvement made within the spirit and principle of the present invention should be included in the protection scope of the invention.

What is claimed is:

1. A method for identifying and extracting a linear object from an image comprising:
   1) acquiring an original image to be processed, wherein the original image to be processed is taken by a camera, received through network transmission, or copied from a compact disc or a removable disk;
   2) preprocessing the original image to obtain an enhanced image;
   3) extracting edges, wherein edge information of the enhanced image is detected to extract an edge information image from the enhanced image;
   4) extracting linear features, wherein linear features of the edge information image are extracted by performing, on the edge information image, a linear feature extracting transform wherein the linear feature extracting transform is a Cluster Radon Transform (CRT) that utilizes a cluster operator in conjunction with a Radon transform, wherein the cluster operator is a function proportional to a cluster distribution density, and the cluster distribution density represents a distribution of edge pixels along a 2-dimensional direction in the edge information image; and
   5) identifying and extracting the linear object, wherein the linear object is identified and extracted by distinguishing the linear object from other linear features by considering characteristics of the linear object to be identified and extracted.

2. The method of claim 1, wherein the Cluster Radon Transform is:

$$R(\rho,\theta) = \int_D I_{\phi,r} f(x,y) \delta(x\cos\theta + y\sin\theta - \rho) dx dy$$

wherein D is the entire edge information image plane, f(x,y) is a binary value of a pixel with coordinates (x,y) on the edge information image, δ is a Dirac Delta function, ρ is a distance between a straight line and the origin of the edge information image plane, θ is an angle between the normal from the origin to the straight line and the x-axis;

$I_{\phi,r}$ is the cluster operator:

$$I_{\varphi,r} = g(\varphi, r) = \frac{\sum f_\varphi(x_i, y_j)}{r} \left(\varphi = \frac{\pi}{2} + \theta\right)$$

wherein g(i) is a function for computing a pixel cluster influence factor, that is, a function proportional to the cluster distribution density, r is a range for computing the cluster operator, ϕ is a direction for computing the cluster operator and has a following relationship with θ in the Radon transform:

$$\varphi = \frac{\pi}{2} + \theta;$$

$f_\phi(x_i, y_j)$ is a value of a pixel (x,y) in the range of r and along the direction of ϕ, $\Sigma f_\phi(x_i, y_j)$ is a sum of values of all of the pixels (x,y) within the range of r along the direction of ϕ.

3. The method of claim 2, wherein a range r of the cluster is set between 5 to 10.

4. The method of claim 1, wherein preprocessing the original image further includes: obtaining the enhanced image by improving smoothness, reducing noises, improving contrast and enhancing linear edge features of/in the original image.

5. The method of claim 4, wherein preprocessing of the original image includes utilizing a Curvelet transform and inverse Curvelet transform.

6. The method of claim 1, wherein the linear object is a power line.

7. The method of claim 6, wherein the linear object is a power line, and the original image is a high-resolution remote sensing image, wherein characteristics of the linear object to be identified and extracted include:

i) Having a simple topological structure, being generally straight and long, and running through the whole high-resolution remote sensing image;
ii) Having a width of approximately 1-2 pixels;
iii) Being parallel to each other;
iv) Having a complicated background including natural features like forests, rivers, and man-made features like roads and buildings; and
v) Having similar backgrounds on both sides, which is different from other linear features such as road boundary.

* * * * *